(12) United States Patent
Park et al.

(10) Patent No.: US 8,055,028 B2
(45) Date of Patent: Nov. 8, 2011

(54) OBJECT POSE NORMALIZATION METHOD AND APPARATUS AND OBJECT RECOGNITION METHOD

(75) Inventors: Gyu-tae Park, Anyang-si (KR); Haitao Wang, Beijing (CN); Young-su Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1121 days.

(21) Appl. No.: 11/889,427

(22) Filed: Aug. 13, 2007

(65) Prior Publication Data

US 2008/0310720 A1 Dec. 18, 2008

(30) Foreign Application Priority Data

Feb. 14, 2007 (KR) ........................ 10-2007-0015529

(51) Int. Cl.
*G06K 9/00* (2006.01)
(52) U.S. Cl. ........................ 382/118; 382/115; 382/190
(58) Field of Classification Search ................... 382/115, 382/117, 118, 128, 131, 154, 190, 208, 276, 382/285, 293, 299
See application file for complete search history.

(56) References Cited

U.S. PATENT DOCUMENTS

| 7,587,068 | B1 * | 9/2009 | Steinberg et al. | 382/118 |
| 7,623,731 | B2 * | 11/2009 | Lim et al. | 382/277 |
| 2002/0006226 | A1 * | 1/2002 | Shiota | 382/203 |
| 2003/0076414 | A1 * | 4/2003 | Sato et al. | 348/148 |
| 2006/0188144 | A1 * | 8/2006 | Sasaki et al. | 382/154 |

FOREIGN PATENT DOCUMENTS

KR 10-0621595 8/2006

OTHER PUBLICATIONS

Blanz, V., et al., "Face Recognition Based on Fitting a 3D Morphable Model," IEEE Transactions on Pattern Analysis and Machine Intelligence, vol. 25, No. 9, Sep. 2003.

* cited by examiner

*Primary Examiner* — Brian Q Le
*Assistant Examiner* — Edward Park
(74) *Attorney, Agent, or Firm* — Staas & Halsey LLP

(57) ABSTRACT

An object pose normalization method and apparatus and an object recognition method are provided. The object pose normalization method includes: determining a pose of a non-frontal image of an object; performing smoothing transformation on the non-frontal image of the object, thereby generating a smoothed object image; and synthesizing a frontal image of the object by using the pose determination result and the smoothed object image. According to the method and apparatus, a front object image can be synthesized by using a non-frontal object image without causing an image distortion problem due to self-occlusion and non-rigid deformation.

15 Claims, 7 Drawing Sheets

CENTER LINE

FIG. 1 (PRIOR ART)
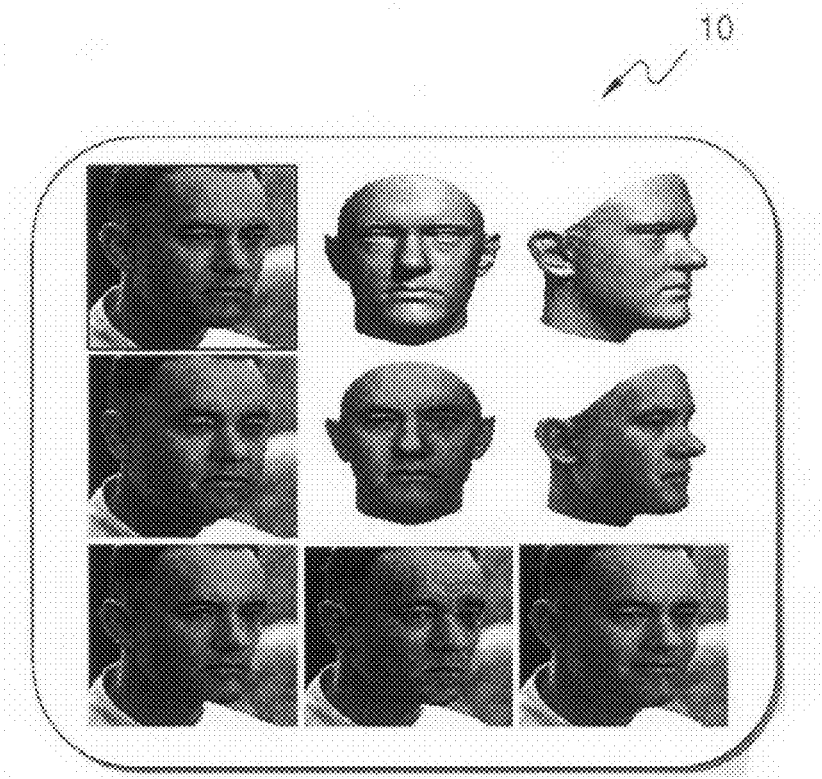
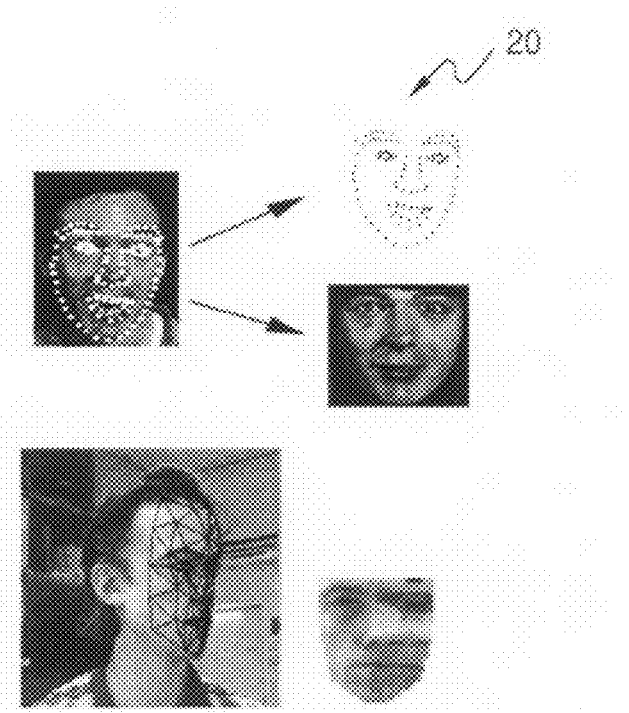

OBJECT POSE NORMALIZATION METHOD AND APPARATUS AND OBJECT RECOGNITION METHOD

CROSS-REFERENCE TO RELATED PATENT APPLICATIONS

This application claims the benefit of Korean Patent Application No. 10-2007-0015529, filed on Feb. 14, 2007, in the Korean Intellectual Property Office, the disclosure of which is incorporated herein in its entirety by reference.

BACKGROUND OF THE INVENTION

1. Field of the Invention

The present invention relates to an object pose normalization apparatus and method, and a method of recognizing an object, and more particularly, to a method of normalizing a non-frontal facial image to a frontal facial image. The method of normalizing a pose of an object can be used in multi-view face recognition systems, video morphing systems, monitoring systems, and digital photo retrieval systems.

2. Description of the Related Art

V. Blanz and T. Vetter have disclosed a method of rendering a facial image having a variety of poses in a 3 dimensional (3D) space in "Face Recognition based on Fitting a 3D Morphable Model (2003)". The 3D morphable model is based on a method of synthesizing a new facial image by using a variety of already known 3D shapes and texture information. FIG. 1 is a reference diagram illustrating examples of synthesizing facial images 10. However, the 3D morphable model has a problem of computational complexity due to calculation of a large number of optimized parameters, and has a disadvantage in terms of initialization of feature points and automatic localization.

Among conventional 2D approaches, there is a method of synthesizing a facial image in which 2D object feature points are detected by using active appearance models (AAMs) or active shape models (ASMs), and by using the detected object feature points, a facial image is synthesized. The AAMs or ASMs use principle component analysis (PCA) or the like in order to model a statistical facial shape and a gray scale. The 2D approaches are methods of transforming texture information of a face to a given shape by Affine-transforming each of triangles formed by the detected facial feature points. An example of synthesizing a facial image by using the ASM is illustrated in the images 20 of FIG. 1. As can be confirmed from FIG. 1, the 2D approaches, such as the ASM, have a problem in that it is difficult to restore a part in which self occlusion occurs. Also, only with the Affine transformation, is a non-rigid deformation unable to be compensated for, and the authentication ratio of face recognition is limited because a gray scale, a shape, and the position of a feature point vary with respect to changes in a pose.

Although a variety of techniques for synthesizing an image have been disclosed as described above, a technology of normalizing a pose of an object by using a 2D image processing technology and utilizing the normalized pose in facial recognition has not yet been disclosed.

SUMMARY OF THE INVENTION

The present invention provides an object pose normalization method and apparatus capable of synthesizing a frontal image of an object by using non-rigid deformation and a non-frontal object image having a characteristic of self occlusion.

The present invention also provides a method of recognizing an object by using an image having a normalized pose of an object.

According to an aspect of the present invention, there is provided an object pose normalization method including: determining a pose of a non-frontal image of an object; performing smoothing transformation on the non-frontal image of the object, thereby generating a smoothed object image; and synthesizing a frontal image of the object by using the pose determination result and the smoothed object image.

Rotation of an object on a 2D space has less influence on pose normalization. However, the object rotation in the depth direction causes non-rigid deformation and occlusion. The pose rotation in the depth direction includes two types, yaw and tilt. In particular, generally in the case of a facial image, yaw causes non-rigid deformation and tilt causes non-rigid deformation and occlusion together. A method of normalizing a pose of an object according to the present invention is to solve the problem caused by tilt in particular. In the case of non-rigid deformation, the absolute distance between arbitrary two pixels can be varied critically, but the surrounding of a pixel is well preserved because of physical constraints. A face has a rigid image but a 2D projection image is a non-rigid image. Accordingly, when a pose changes, serious non-rigid deformation occurs. However, the relative positions of the chin, nose, mouth, and eyes are physically limited by bones and muscles, and the relative positions do not change independently. The present invention is to synthesize a frontal image by normalizing a pose of an object through a 2D approach having less complexity of computation. According to the present invention, distortion in a synthesized image due to non-rigid deformation and occlusion can be prevented.

According to another aspect of the present invention, there is provided an object pose normalization apparatus including: a pose determination unit determining a pose of a non-frontal image of an object; a smoothing unit performing smoothing transformation on the non-frontal image of the object, thereby generating a smoothed object image; and a synthesis unit synthesizing a frontal image of the object by using the pose determination result and the smoothed object image.

According to another aspect of the present invention, there is provided a method of recognizing an object including: determining a pose of a non-frontal image of an object; performing smoothing transformation on the non-frontal image of the object, thereby generating a smoothed object image; synthesizing a frontal image of the object by using the pose determination result and the smoothed object image; and generating an object descriptor from the synthesized frontal image and based on the generated object descriptor, performing recognition of the object.

According to still another aspect of the present invention, there is provided a computer readable recording medium having embodied thereon a computer program for executing the method of normalizing a pose of an object.

BRIEF DESCRIPTION OF THE DRAWINGS

The above and other features and advantages of the present invention will become more apparent by describing in detail exemplary embodiments thereof with reference to the attached drawings in which:

FIG. 1 is a diagram illustrating an example of face image synthesis according to conventional technology;

DETAILED DESCRIPTION OF THE INVENTION

The present invention will now be described more fully with reference to the accompanying drawings, in which exemplary embodiments of the invention are shown.

Figure 2:
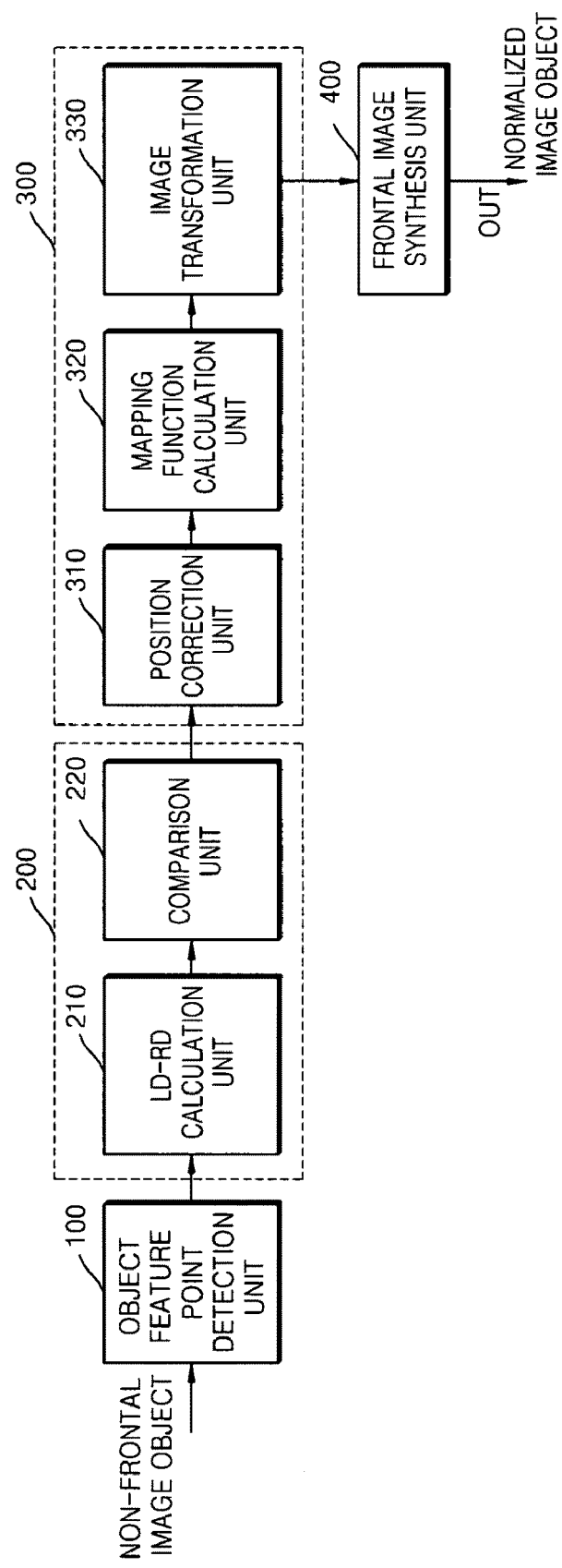
FIG. 2 is a block diagram illustrating an apparatus for normalizing a pose of an object according to an embodiment of the present invention.

FIG. 2 is a block diagram illustrating an apparatus for normalizing a pose of an object according to an embodiment of the present invention. The object pose normalization apparatus according to the current embodiment is composed of an object feature point detection unit 100, a pose determination unit 200, a smoothing unit 300, and a frontal image synthesis unit 400. Here, object pose normalization means normalization in relation to a direction in which an object is directed, for example, a direction in which the face of a person is directed. In particular, in the present invention, transformation of a non-frontal image to a frontal image is referred to as object pose normalization.

The object feature point detection unit 100 receives an input of an image of an object, and detects object feature points from the input object image. For example, the object feature point detection unit 100 can extract predetermined points related to the eyes, nose, eyebrows, and mouth of the face and facial contours of a person, as object feature points.

Figure 4:
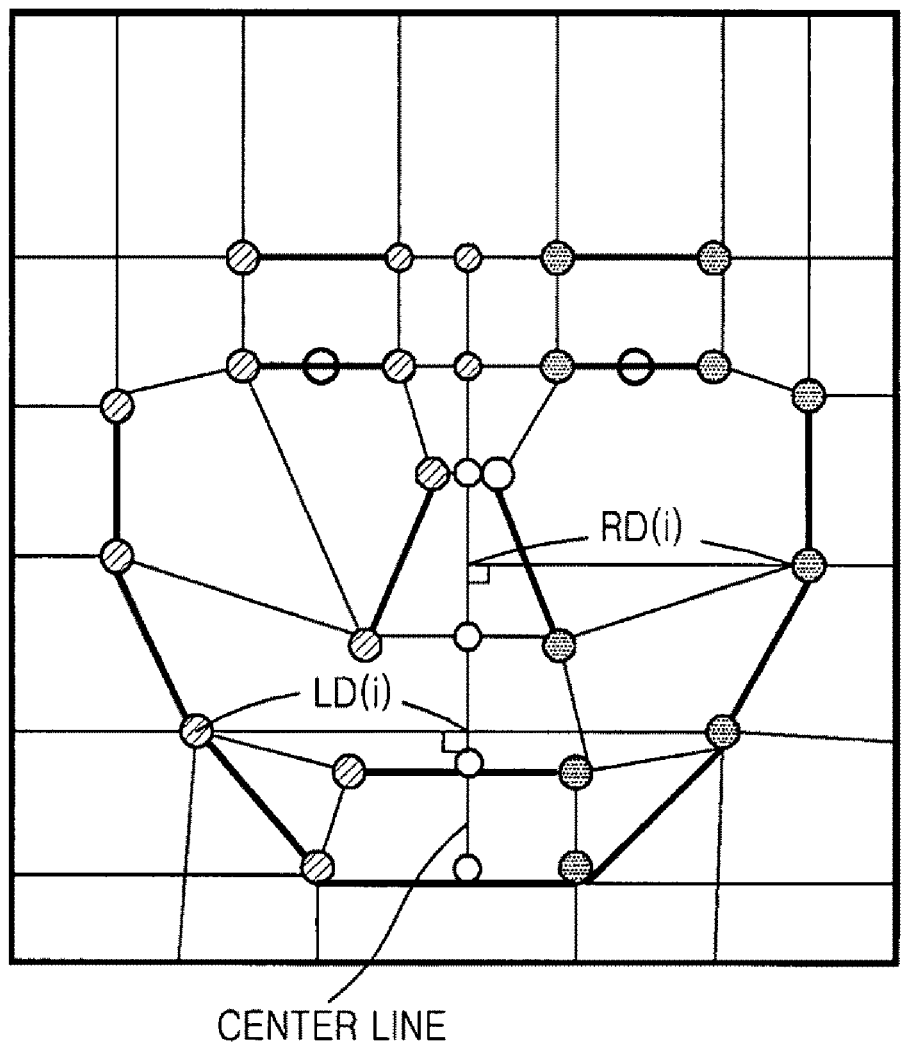
FIG. 4 is a reference diagram illustrating an example of detecting an object feature point in the method illustrated in FIG. 3 according to an embodiment of the present invention.

Also, in the current embodiment, the object detection unit 100 sections the object image in which feature points are extracted, according to a predetermined criterion. Referring to FIG. 4, the object detection unit 100 draws a horizontal line with respect to the center of the two eyes, calculates the distance D between the two eyes, and then, can section the object image so that the object image can have a predetermined width (3D) and height (4D). In FIG. 4, a central line is at the symmetrical center of the left and right parts of the face, and a function of the central line can be expressed as x=m. Here, m is positioned inside the face outline, and indicates that the mean (m) of x coordinate values of 6 pairs of feature points face each other.

Referring back to FIG. 2, the pose determination unit 200 determines a pose of a non-frontal image of the object, by using the detected object feature points. In the current embodiment, the pose determination unit 200 includes an LD-RD calculation unit 210 and a comparison unit 220.

The LD-RD calculation unit 210 calculates a mean distance (RD) between object feature points positioned to the right of the center line and the center line, and a mean distance (LD) between object feature points positioned to the left of the center line. The comparison unit 220 compares the RD and LD, and determines a pose of the object image. As the result of the pose determination, the comparison unit generates pose information, and transfers the generated pose information to the frontal image synthesis unit 400.

The smoothing unit 300 generates a smoothed object image, by performing smoothing transformation on the non-frontal object image. The smoothing unit 300 includes a position correction unit 310, a mapping function calculation unit 320, and an image transformation unit 330.

The position correction unit 310 corrects the positions of object feature points so that object feature points facing each other with a predetermined center line at the center can be symmetrical to each other.

Figure 5:
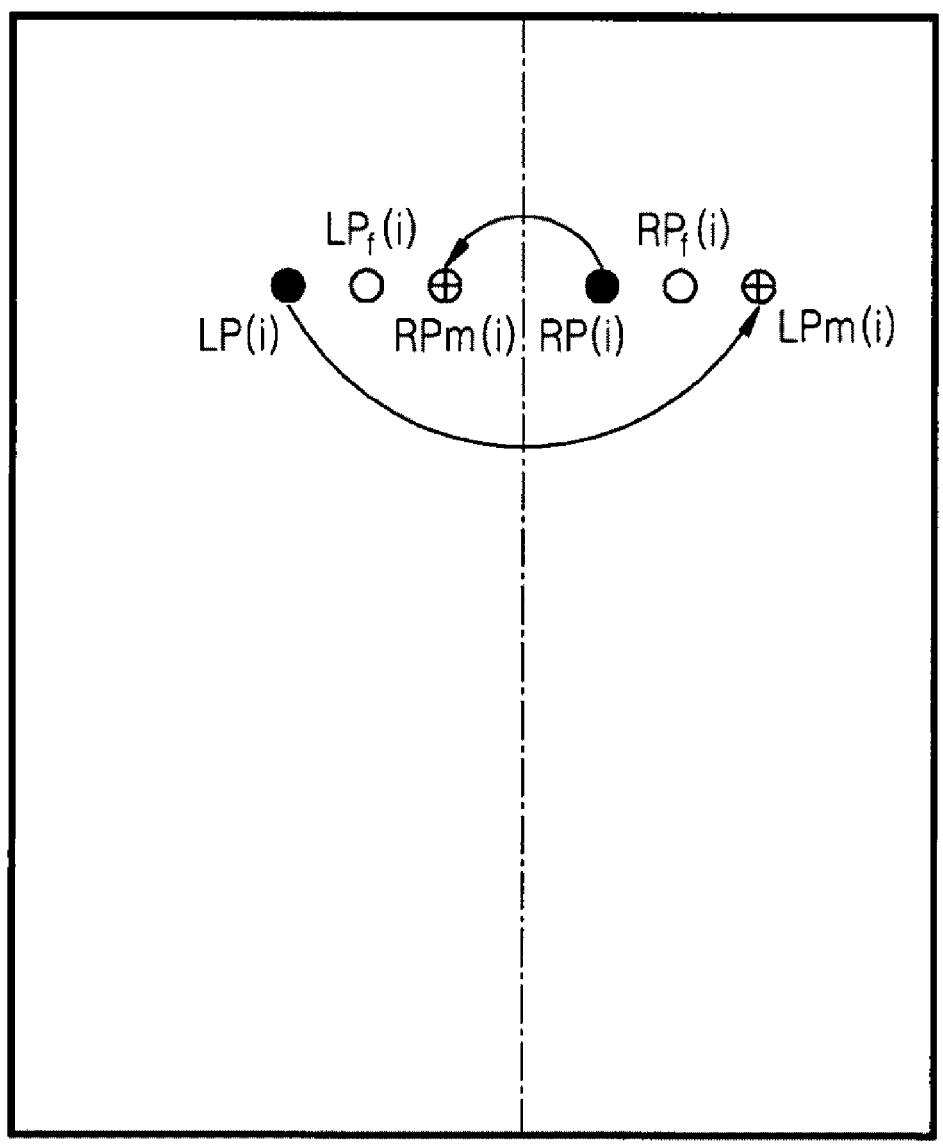
FIG. 5 is a reference diagram explaining position correction illustrated in FIG. 3 according to an embodiment of the present invention.
Figures 6A, 6B, 6C, 6D:
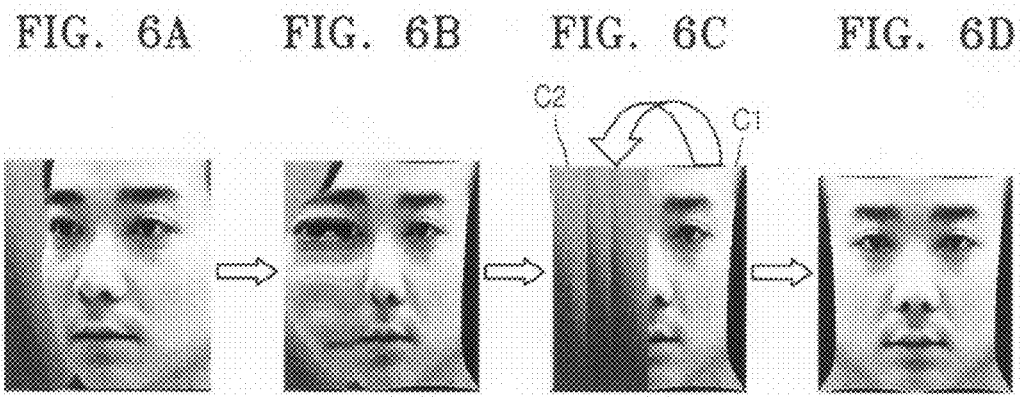
FIGS. 6A-6G are reference diagrams illustrating an example of synthesizing an object image from an input of a non-frontal object image according to an embodiment of the present invention.
Figure 6E:
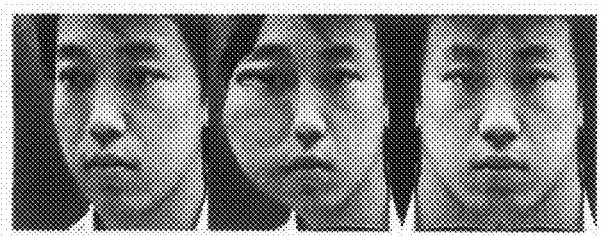
Figure 6F:
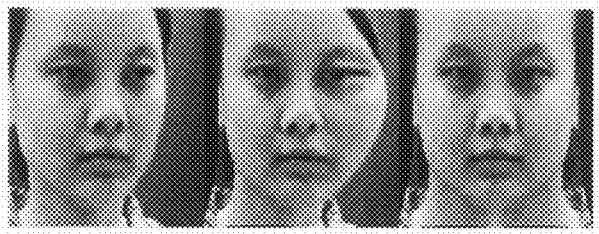
Figure 6G:
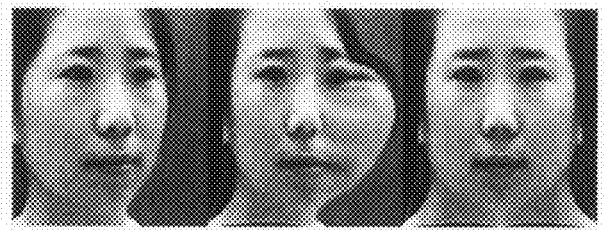

FIG. 5 is a diagram illustrating a concept of correcting the positions of object feature points. The correction of the positions of the object feature points is performed as given by equation 1 below:

$$RP_f(i) = \frac{RP(i) + LP_m(i)}{2}, \quad LP_f(i) = \frac{LP(i) + RP_m(i)}{2} \quad (1)$$

Here, RP(i) is the coordinates of a feature point positioned to the right of a center line, $RP_m(i)$ is a mirrored feature point of RP(i), LP(i) is the coordinates of a feature point positioned to the left of the center line, $LP_m(i)$ is a mirrored feature point of LP(i), $RP_f(i)$ is the coordinates of a corrected right feature point, and $LP_f(i)$ is the coordinates of a corrected left feature point. According to the correction, the feature points positioned on the area to the right of the center line and the feature points positioned on the area to the left of the center line have symmetrical relationships.

Referring back to FIG. 2, the mapping function calculation unit 320 calculates a mapping function to transform each of the object feature points, which were detected in the object feature point detection unit 100, into a target feature point. Here, the target feature point means a feature point having a position corrected according to equation 1. The mapping function calculation unit 320 calculates a mapping function by using a thin plate spline (TPS) algorithm. The TPS algorithm will be explained later.

The image transformation unit 330 transforms positions of all pixels included in an original image according to the mapping functions calculated in the mapping function calculation unit 320 for smoothing of an object image. In the object image transformed in the image transformation unit 330, the positions of object feature points correspond to those of a frontal image. However, the object image has a limitation in that the front image of the left area in which self occlusion occurs according to a pose, as illustrated in an image (B) of FIG. 6, is distorted.

The frontal image synthesis unit 400 synthesizes a frontal image of the object by using the result of the pose determination and the smoothed object image.

For example, if an input facial image has a pose directed to the left, the frontal image synthesis unit 400 receives information on the pose of the object from the pose determination unit 200, and replaces the left part of the facial image which is smoothed by the image transformation unit 330 and in which occlusion occurs, with the right part of the facial image. This is because a facial image has a symmetrical characteristic and a distorted area can be replaced with a not-distorted area.

Figure 3:
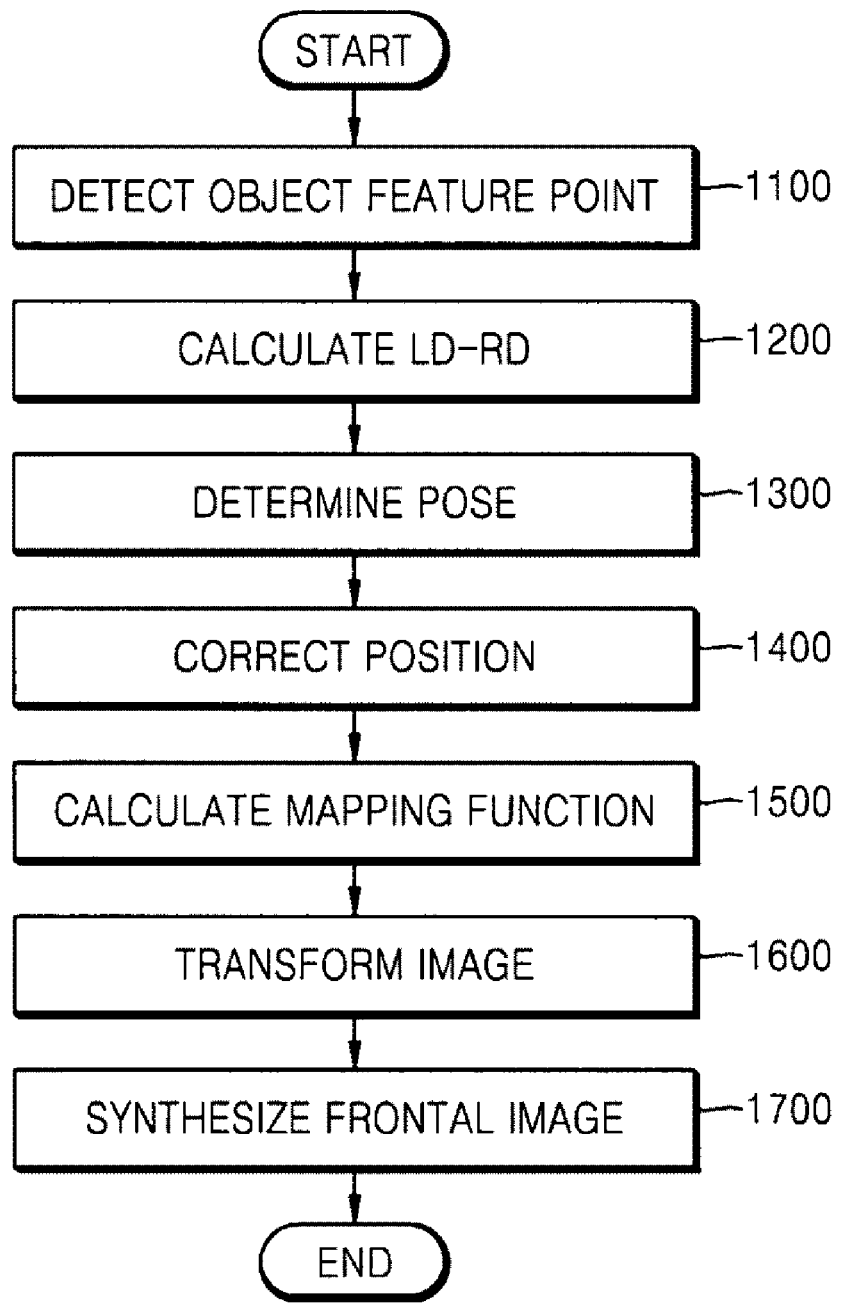
FIG. 3 is a flowchart illustrating a method of normalizing a pose of an object according to an embodiment of the present invention.

FIG. 3 is a flowchart illustrating a method of normalizing a pose of an object according to an embodiment of the present invention. The method according to the current embodiment includes the following operations performed in an object pose normalization apparatus.

In operation 1100, the object feature point detection unit 100 detects object feature points from a non-frontal image of an object. Although object feature points may be detected from a frontal image of an object, in such a case, normalization of a pose of the object is hardly necessary, and therefore, a situation, mainly in which a non-frontal image is input, will now be explained.

Among methods of detecting object feature points, there are active appearance models (AAMs) or active shape models (ASMs). The ASM is a model in which the positions of the eyes are detected, and based on the detected positions of the eyes, positions are determined by using shape information established according to a generic model, for example, shape information of major feature parts of a face, such as the nose, mouth, and eyebrows. The AAM is a model which detects feature points capable of more efficiently describing facial features, by further considering texture information in addition to the shape information. In the current embodiment of the present invention, facial feature points are detected by using the ASM.

FIG. 4 illustrates an example in which object feature points are detected in operation 1100. In FIG. 4, the object feature points include a total of 22 facial feature points, including 8 facial contour feature points, 4 eye feature points, 4 nose feature points, 4 eyebrow feature points, and 2 mouth feature points.

In operation 1200 illustrated in FIG. 3, the LD-RD calculation unit 210 illustrated in FIG. 2 calculates LD-RD.

Referring to FIG. 4, RD(i) means the distance between an object feature point positioned on the area to the right of a center line, and the center line, and LD(i) means the distance between an object feature point positioned on the area to the left of the center line, and the center line. The RD and LD for determining a pose of a facial image is expressed as given by equation 2 below:

$$LD = \frac{1}{N}\sum_{i=1}^{N} LD(i) \quad (2)$$

$$RD = \frac{1}{N}\sum_{i=1}^{N} RD(i)$$

Here, LD is the mean distance between the object feature points on the area to the left of the center line, RD is the mean distance between the object feature points on the area to the right of the center line, and N is the number of feature points which is 11 in the case illustrated in FIG. 4.

In operation 1300, the comparison unit 220 determines the pose of the object by comparing the LD and RD calculated in the LD-RD calculation unit 210. Here, the comparison unit 220 determines whether the current input image has a frontal pose, a left pose or a right pose relative to a predetermined center line, and transfers pose information, as the result of the pose determination, to the frontal image synthesis unit 400.

In particular, if the determination result of equation 2 is LD−RD>T, where T is a predetermined threshold value, the comparison unit 220 determines that the object image has a right pose, if LD−RD<−T, the comparison unit 220 determines that the object image has a left pose, and if ||LD−RD||<T, the comparison unit 220 illustrated in FIG. 2 determines that the object image has a frontal pose.

In operation 1400, the position correction unit 310 corrects the positions of object feature points facing each other with the center line as the symmetrical axis.

In particular, the position correction unit 310 illustrated in FIG. 2 calculates the mean of each original feature point position and the mirrored feature point position according to equation 1, and corrects the original feature point position according to the calculation result.

FIG. 5 is a reference diagram explaining operation 1400 illustrated in FIG. 3 according to an embodiment of the present invention. In the case of a non-frontal object image, an original feature point LP(i) is not symmetrical to RP(i) with the center line at the center. $LP_m(i)$ is a mirrored feature point of LP(i), with the center line as the symmetrical axis, and $RP_m(i)$ is a mirrored feature point of RP(i) with the center line as the symmetrical axis. The $LP_f(i)$ and $RP_f(i)$ calculated according to equation 1 are symmetrical to each other about the center line as the symmetrical axis.

In operation 1500, the mapping function calculation unit 320 calculates a mapping function to transform an original feature point to a target feature point.

Here, target feature point means a feature point having a position corrected according to equation 1. In particular, in operation 1500, the mapping function calculation unit 320 calculates a mapping function by using a TPS algorithm.

In the current embodiment, the mapping function calculation unit 320 uses the TPS algorithm to transform an image. If it is assumed that the coordinates of the original object feature points are $P_1=(x_1, y_1)$, $P_2=(x_2, y_2)$, $P_2=(x_3, y_3)$, through $P_N=(x_N, y_N)$, the coordinates of target object feature points are $P'_1=(x'_1, y'_1)$, $P'_2=(x'_2, y'_2)$, $P'_3=(x'_3, y'_3)$, through $P'_N=(x'_N, y'_N)$, and $P=[P_1, P_2,$ through $P_N]$, and $P'=[P'_1, P'_2,$ through $P'_N]$, a mapping function (f) satisfying $f(P)=P'$ can be calculated as given by equations 3 through 5 below:

$$f(x, y) = a_1 + a_x x + a_y y + \sum_{i=1}^{N} w_i U(\|(x_i, y_i) - (x, y)\|) \quad (3)$$

Here, $$\sum_{i=1}^{N} w_i = 0; \quad \sum_{i=1}^{N} w_i x_i = 0; \quad \sum_{i=1}^{N} w_i y_i = 0, \quad U(r) = -r^2 \log r^2,$$

N is the number of object feature points, $(x_i, y_i)$ are the coordinates of an arbitrary object feature points.

$$I_f = \iint_{R^2}(f_{xx}^2 + 2f_{xy}^2 + f_{yy}^2)dxdy \quad (4)$$

Here, $I_f$ is a bending energy function, and f is a function minimizing $I_f$.

$$\begin{bmatrix} K & P \\ P^T & O \end{bmatrix}\begin{bmatrix} w \\ a \end{bmatrix} = \begin{bmatrix} v \\ o \end{bmatrix} \quad (5)$$

Here, $K_{ij}=U(\|(x_i, y_i)-(x, y)\|)$, $w=[w_1, w_2, \ldots, w_N]$, $a=[a_1, a_x, a_y]$, $$v = \begin{bmatrix} 1 & x'_1 & y'_1 \\ \ldots & \ldots & \ldots \\ 1 & x'_N & y'_N \end{bmatrix}, \text{ and } P = \begin{bmatrix} 1 & x_1 & y_1 \\ \ldots & \ldots & \ldots \\ 1 & x_N & y_N \end{bmatrix}.$$

If the solution of equation 5 is calculated, parameters w and a of the mapping function, and the mapping function itself can be determined. In particular, a process of transforming an original point to a target point may be performed in two steps. The first step of the process is horizontal warping and the second step of the process is vertical warping. In this case, assuming that a function related to the horizontal warping is $f_x$ and a function related to the vertical warping is $f_y$, a method of obtaining each of the mapping functions will now be explained.

Assuming that the original feature point is $(x_i, y_i)$ and the target feature point is $(x_i', y_i')$, first, by transforming $(x_i, y_i)$ only in the x-axis direction, the mapping function $f_x$ for obtaining a preliminary target feature point $(x_i', y_i)$ is calculated. Next, by transforming the preliminary target feature point $(x_i', y_i)$ only in the y-axis direction, the mapping function for obtaining the target feature point $(x_i', y_i')$ is calculated. Here, the parameters $w_x$ and $a_x$ of $f_x$ can be calculated by using the original feature point $(x_i, y_i)$, the first target feature point $(x_i', y_i)$, and equations 3 through 5. Likewise, the parameters $w_y$ and $a_y$ of $f_y$ can also be calculated in the same manner.

In operation 1600, the image transformation unit 330 transforms the original object image into a smoothed image according to the calculated mapping function. In the object image transformed in the image transformation unit 330, the positions of the object feature points correspond to those of a frontal image. However, since self occlusion occurs, the following operations are required.

In operation 1700, the frontal image synthesis unit 400 illustrated in FIG. 2 synthesizes a frontal image of the object by using the pose determination result and the smoothed object image.

In particular, the frontal image synthesis unit 400 distinguishes an area in which occlusion occurs, from an area in which no occlusion occurs, in the smooth object image according to the pose determination result, and replaces the area in which the occlusion occurs, with the area in which no occlusion occurs, thereby synthesizing the frontal image of the object.

An example of synthesizing a frontal image is illustrated in images (A) through (D) of FIG. 6. The image (A) is an original non-frontal facial image, and the image (B) is a facial image smoothed according to the TPS algorithm. In the image (C), an area C2 is a part in which occlusion occurs, and will be replaced by an area C1 in which no occlusion occurs. The facial image (A) of FIG. 6 has a pose directed to the left, and in the left area, self occlusion is observed. By using the result of the pose determination, that is, by considering that the pose is directed to the left, the frontal image synthesis unit 400 replaces an area (left area) in which occlusion occurs, with an area (right area) in which no occlusion occurs, thereby synthesizing a new facial image. This is based on the symmetry of a face. In the facial image (B), distortion of the facial image due to self occlusion is serious, and therefore the facial image (B) is not appropriate for use in face recognition. However, the newly synthesized facial image (D) does not have a self occlusion problem.

Also, according to the current embodiment, the frontal image synthesis unit 400 illustrated in FIG. 2 does not perform a separate process of determining whether or not occlusion occurs in the smoothed facial image (B), but synthesizes a frontal image by considering the result of the pose determination. Accordingly, the embodiment has an advantage in terms of complexity of computation. Facial images (E) through (F) illustrated in FIG. 6 are examples of frontal facial images according to the current embodiment. When the finally synthesized frontal facial images, which are smoothed from the inputs of the original facial images, are compared, it can be confirmed that the finally synthesized frontal facial images are quite similar to the respective original facial images.

Figure 7:
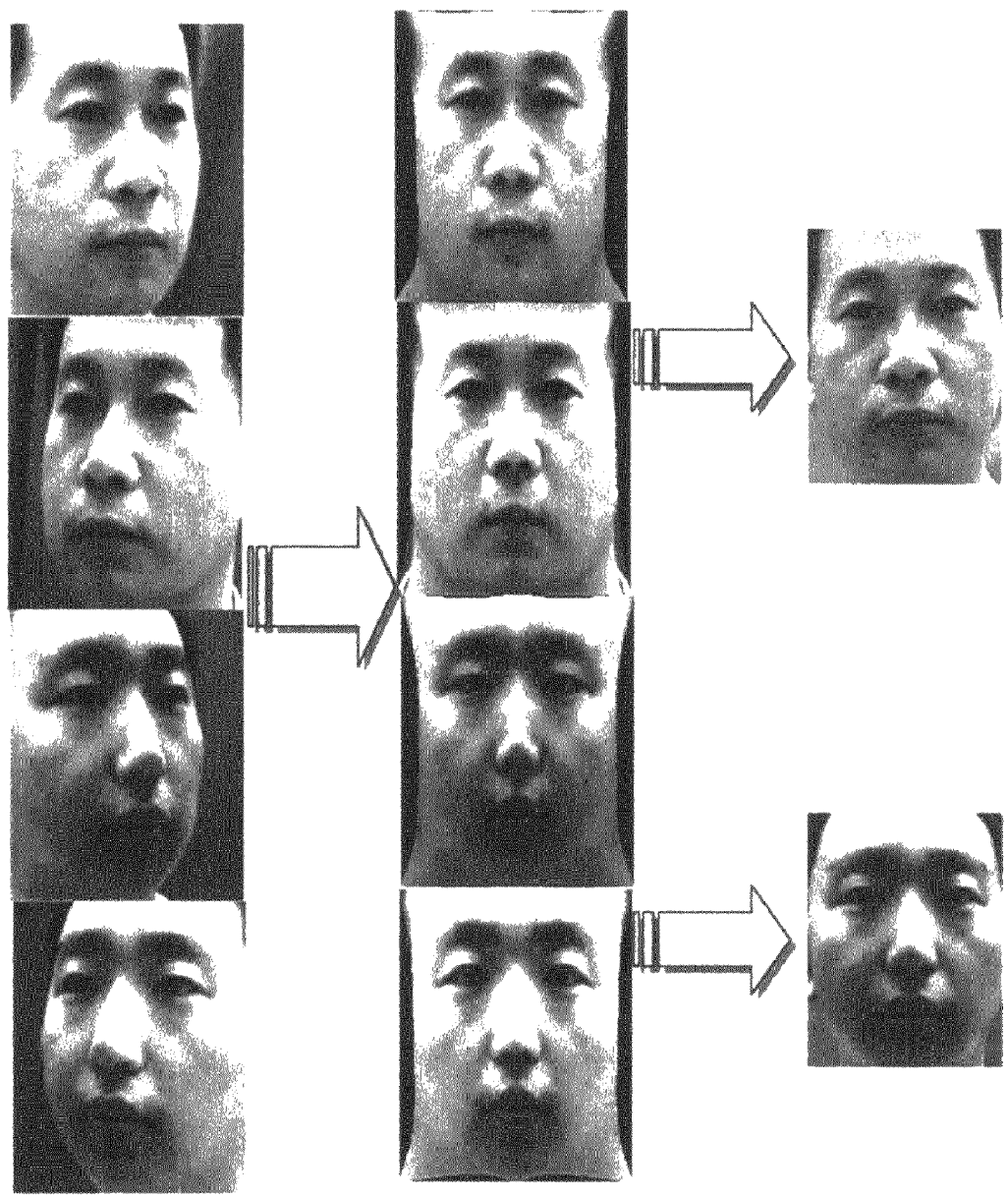
FIG. 7 is a reference diagram illustrating an example of synthesizing a frontal object image from inputs of non-frontal object images having different poses according to an embodiment of the present invention.

FIG. 7 is a reference diagram illustrating an example of synthesizing a frontal object image from inputs of non-frontal object images having different poses according to an embodiment of the present invention. When the poses are opposite to each other, it can be confirmed that the finally synthesized frontal facial images are similar to each other, and also similar to an actual frontal facial image.

Also, the present invention provides an object recognition method using an object image normalized according to the object pose normalization method described above. The object image normalized according to the object pose normalization method described above is an image having a frontal pose, and the facial image normalized from a pose can be effectively used in face recognition and face verification.

2D images of the face of a person varies greatly with respect to the pose, and the conventional face recognition method which does not consider this is sensitive to changes in the pose, and due to the changes in the pose, recognition or verification errors occur. However, if an image to be used in face recognition is transformed to a facial image normalized according to the present invention, and based on the normalized facial image, face recognition is performed, the problems of the conventional method can be solved or reduced.

In order to perform object recognition by using a synthesized image in which a pose of an object is normalized, it is necessary to extract an object descriptor from the normalized synthesized image. There are no special restrictions in the method of extracting an object descriptor, and, for example, a feature vector may be extracted from an object image by using a Gabor wavelet transform, or a feature point may be extracted by using techniques, such as the ASM and AAM. If the object descriptor is extracted, the similarity between object images can be determined by using the distance or similarity degrees between object descriptors, and by using the result of similarity determination, face recognition or verification can be performed.

According to the present invention, a pose of an object is normalized by using pose, smoothing transformation, and the symmetrical characteristic of an object image. In this way, the problem of image distortion due to self occlusion and non-rigid deformation does not occur, and a non-frontal image of an object can be transformed to a frontal image. Also, the problem of complexity of computation which occurs when the conventional 3D morphable model is used can be solved.

Furthermore, since the errors occurring due to changes in the gray scale, shape, and positions of feature points according to changes in the pose can be reduced, the successful authentication ratio in face recognition can be improved.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An object pose normalization method comprising:
    determining, performed by at least one processor, a pose of a non-frontal image of an object by determining a center line dividing object feature points of the non-frontal image and using a symmetrical relationship obtained by mean distances between the object feature points and the center line;
    performing smoothing transformation on the non-frontal image of the object, thereby generating a smoothed object image; and
    synthesizing a frontal image of the object by using the pose determination result and the smoothed object image,
    wherein, in the determining of the pose a first mean distance, of the mean distances, is obtained between a first plurality of object feature points existing in one side of the center line of the non-frontal image and the center line, and a second mean distance, of the mean distances, is obtained between a second plurality of object feature points existing in another side of the center line, different from the one side, of the non-frontal image and the center line, and the first mean distance is compared with the second mean distance to determine the pose.

2. The method of claim 1, wherein in the performing of the smoothing transformation, the smoothing transformation on the non-frontal image uses a thin plate spline (TPS) algorithm.

3. The method of claim 2, wherein the detecting of the object feature points uses an active shape model (ASM) or an active appearance model (AAM).

4. The method of claim 1, further comprising:
    correcting the positions of the object feature points so that the object feature points facing each other about the determined center line at the center become symmetrical,
    wherein in the performing of the smoothing transformation on the non-frontal image of the object, the smoothing transformation uses the positions of the corrected object feature points.

5. The method of claim 4, wherein the correcting of the object feature points is performed according to an equation below:

$$RP_f(i) = \frac{RP(i) + LP_m(i)}{2}, LP_f(i) = \frac{LP(i) + RP_m(i)}{2}$$

where RP(i) is the coordinates of a feature point positioned to the right of a center line, $RP_m(i)$ is a mirrored feature point of RP(i), LP(i) is the coordinates of a feature point positioned to the left of the center line, $LP_m(i)$ is a mirrored feature point of LP(i), $RP_f(i)$ is the coordinates of a corrected right feature point, and $LP_f(i)$ is the coordinates of a corrected left feature point.

6. The method of claim 1, further comprising:
    correcting the positions of the object feature points so that the object feature points facing each other about the determined center line become symmetrical,
    wherein the performing of the smoothing transformation on the non-frontal image of the object uses a mapping function for mapping the positions of the object feature points detected from the non-frontal image of the object to the corrected positions.

7. The method of claim 1, wherein in the synthesizing of the frontal image of the object, an area in which occlusion occurs, and an area in which no occlusion occurs are determined in the smoothed object image according to the result of the pose determination, and the area in which the occlusion occurs is replaced with the area in which no occlusion occurs, thereby synthesizing the frontal image of the object.

8. An object pose normalization method comprising:
    determining, performed by at least one processor, a pose of a non-frontal image of an object;
    performing smoothing transformation on the non-frontal image of the object, thereby generating a smoothed object;
    synthesizing a frontal image of object by using the pose determination result and the smoothed object image;
    determining a center line dividing object feature points of the non-frontal image;
    correcting the positions of the object feature points so that the object feature points facing each other about the center line become symmetrical, wherein in the performing of the smoothing transformation on the non-frontal image of the object, the smoothing transformation uses the positions of the corrected object feature points, and
    wherein in the correcting of the positions of the object feature points, the position of a mirrored feature point of each of the object feature points is determined about the determined center line, and the mean positions of the object feature points and the mirrored feature points related to the object feature points are calculated, and then, the positions of the object feature points are corrected according to the calculated mean positions, respectively.

9. An object pose normalization method comprising:
    determining, performed by at least one processor, a pose of a non-frontal image of an object;
    performing smoothing transformation on the non-frontal image of the object, thereby generating a smoothed object image; and
    synthesizing a frontal image of the object by using the pose determination result and the smoothed object image,
    wherein in the synthesizing of the frontal image of the object, an area in which occlusion occurs, and an area in which no occlusion occurs are determined in the smoothed object image according to the result of the pose determination, and the area in which the occlusion occurs is replaced with the area in which no occlusion occurs, thereby synthesizing the frontal image of the object, and
    wherein in the replacing of the area in which the occlusion occurs with the area in which no occlusion occurs, a center line halving the smoothed object image is determined, and the area in which the occlusion occurs, and the area in which no occlusion occurs are determined in the areas halved by the center line according to the result of the pose determination, and then, the area in which the occlusion occurs is replaced with the area in which no occlusion occurs.

10. A non-transitory computer readable recording medium having embodied thereon a computer program for executing the method of any one of claims 1, 2, and 4 through 9.

11. An object pose normalization apparatus comprising:
   a pose determination unit to determine a pose of a non-frontal image of an object;
   a smoothing unit to perform smoothing transformation on the non-frontal image of the object, thereby generating a smoothed object image; and
   a synthesis unit to synthesize a frontal image of the object by using the pose determination result and the smoothed object image,
   wherein the pose determination unit determines a center line dividing object feature points of the non-frontal image and uses a symmetrical relationship obtained by mean distances between the object feature points and the center line,
   wherein the pose determination unit comprises:
   a mean distance calculation unit to calculate a first mean distance, of the mean distances, between a first plurality of object feature paints existing in one side of the center line of the non-frontal image and the center line, and to calculate a second mean distance, of the mean distances between a second plurality of object feature points existing in another side, other than the one side, of the center line and the center line; and
   a comparison unit to compare the first mean distance with the second mean distance, thereby to determine the pose.

12. The apparatus of claim 11, wherein the smoothing unit performs the smoothing transformation on the non-frontal image by using a TPS algorithm.

13. The apparatus of claim 11, wherein the smoothing unit further comprises:
   a position correction unit to correct the positions of the object feature points so that the object feature points facing each other about a predetermined center line at the center become symmetrical;
   a mapping function calculation unit to calculate a mapping function for mapping the detected positions of the object feature points to the corrected positions; and
   an image transformation unit to transform the non-frontal object image to a smoothed object image according to the calculated mapping function.

14. The apparatus of claim 11, wherein according to the result of the pose determination by the pose determination unit, the synthesis unit determines an area in which occlusion occurs, and an area in which no occlusion occurs, in the smoothed object image, and replaces the area in which the occlusion occurs with the area in which no occlusion occurs, thereby synthesizing the frontal image of the object.

15. A method of recognizing an object comprising:
   determining, performed by at least one processor, a pose of a non-frontal image of an object by determining a center line dividing object feature points of the non-frontal image and using a symmetrical relationship obtained by mean distances between the object feature points and the center line;
   performing smoothing transformation on the non-frontal image of the object, thereby generating a smoothed object image;
   synthesizing a frontal image of the object by using the pose determination result and the smoothed object image; and
   generating an object descriptor from the synthesized frontal image, and
   based on the generated object descriptor, performing recognition of the object,
   wherein in the determining of a pose of a non-frontal image, a first mean distance, of the mean distances, is obtained between a first plurality of object feature points existing in one side of the center line of the non-frontal image and the center line, a second mean distance, of the mean distances, is obtained between a second plurality of object feature points existing in another side, other than the one side, of the center line and the center line, and the first mean distance is compared with the second mean distance.

* * * * *

UNITED STATES PATENT AND TRADEMARK OFFICE
CERTIFICATE OF CORRECTION

PATENT NO.         : 8,055,028 B2                                   Page 1 of 1
APPLICATION NO.    : 11/889427
DATED              : November 8, 2011
INVENTOR(S)        : Gyu-tae Park et al.

It is certified that error appears in the above-identified patent and that said Letters Patent is hereby corrected as shown below:

Column 11, Line 20, In Claim 11, delete "paints" and insert -- points --, therefor.

Column 11, Line 22, In Claim 11, delete "distances" and insert -- distances, --, therefor.

Signed and Sealed this
Fourteenth Day of February, 2012

David J. Kappos
*Director of the United States Patent and Trademark Office*